United States Patent
Kakuda (10) Patent No.: US 11,411,429 B2
(45) Date of Patent: Aug. 9, 2022

(54) MANAGEMENT SYSTEM, MANAGEMENT METHOD, POWER CONVERSION DEVICE, AND MANAGEMENT DEVICE

(71) Applicant: KYOCERA CORPORATION, Kyoto (JP)

(72) Inventor: Yuji Kakuda, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 713 days.

(21) Appl. No.: 16/089,570

(22) PCT Filed: Mar. 8, 2017

(86) PCT No.: PCT/JP2017/009194
§ 371 (c)(1),
(2) Date: Sep. 28, 2018

(87) PCT Pub. No.: WO2017/169585
PCT Pub. Date: Oct. 5, 2017

(65) Prior Publication Data
US 2020/0287409 A1    Sep. 10, 2020

(30) Foreign Application Priority Data
Mar. 29, 2016 (JP) .............................. JP2016-066753

(51) Int. Cl.
*H02J 13/00* (2006.01)
*H02J 3/32* (2006.01)
(Continued)

(52) U.S. Cl.
CPC ........ *H02J 13/00016* (2020.01); *G05B 15/02* (2013.01); *H02J 3/32* (2013.01);
(Continued)

(58) Field of Classification Search
CPC .. H02J 13/00016; H02J 13/00001; H02J 3/32; H02J 3/381; H02J 2300/24;
(Continued)

(56) References Cited

U.S. PATENT DOCUMENTS

| 10,424,932 B2* | 9/2019 | Endo ..................... H02J 7/0068 |
| 2010/0141046 A1* | 6/2010 | Paik ........................ H02J 3/14 307/126 |

(Continued)

FOREIGN PATENT DOCUMENTS

| JP | 2013-5537 A | 1/2013 |
| JP | 2014-3838 A | 1/2014 |

(Continued)

*Primary Examiner* — Charles R Kasenge
(74) *Attorney, Agent, or Firm* — Hauptman Ham, LLP (57) ABSTRACT

A management system includes a power conversion device converting power output from a distributed power source and a management device. The management device includes a transmitter transmitting to the power conversion device a command requesting a state of the power conversion device. The power conversion device includes a transmitter transmitting to the management device a response command including a property indicating a state of the power conversion device in response to the command. The property includes output suppression information on output suppression of the distributed power source based on output suppression specified by a provider.

12 Claims, 6 Drawing Sheets

(51) Int. Cl.
*H02J 3/38* (2006.01)
*G05B 15/02* (2006.01)

(52) U.S. Cl.
CPC ........ *H02J 3/381* (2013.01); *H02J 13/00001* (2020.01); *H02J 2300/24* (2020.01)

(58) Field of Classification Search
CPC ...... H02J 3/383; G05B 15/02; Y02E 60/7838; Y02E 60/00; Y02E 10/56; Y02E 70/30; Y02E 40/70; Y04S 10/123; Y04S 40/124; Y04S 10/40; Y04S 10/14
See application file for complete search history.

(56) References Cited

U.S. PATENT DOCUMENTS

| | | | | |
|---|---|---|---|---|
| 2010/0145884 A1* | 6/2010 | Paik | ................ | G06Q 50/06 705/412 |
| 2011/0227343 A1* | 9/2011 | Yasugi | ................ | F03D 7/0296 290/44 |
| 2012/0086397 A1* | 4/2012 | Obayashi | ................ | B60L 53/51 320/109 |
| 2012/0181974 A1* | 7/2012 | Kuniyosi | ............ | H02J 13/0006 320/101 |
| 2012/0232712 A1* | 9/2012 | Paik | ................ | H02J 3/14 700/295 |
| 2012/0310428 A1* | 12/2012 | Katagi | ................ | H04L 63/0428 700/292 |
| 2013/0257179 A1* | 10/2013 | Sakai | ................ | H02J 3/383 307/126 |
| 2014/0025213 A1* | 1/2014 | Otsuki | ................ | H02J 3/008 700/291 |
| 2014/0336837 A1* | 11/2014 | Kiuchi | ................ | G05B 15/02 700/295 |
| 2016/0313754 A1* | 10/2016 | Katagi | ................ | H02J 3/32 |

FOREIGN PATENT DOCUMENTS

| | | |
|---|---|---|
| JP | 2014-171359 A | 9/2014 |
| JP | 2015-119356 A | 6/2015 |

* cited by examiner

MANAGEMENT SYSTEM, MANAGEMENT METHOD, POWER CONVERSION DEVICE, AND MANAGEMENT DEVICE

RELATED APPLICATIONS

The present application is a National Phase of International Application No. PCT/JP2017/009194, filed Mar. 8, 2017, and claims priority of Japanese Patent Application No. 2016-066753, filed on Mar. 29, 2016.

TECHNICAL FIELD

The present invention relates to a management system, a management method, a power conversion device, and a management device.

BACKGROUND ART

In recent years, a management system including a power conversion device controlling a distributed power source and a management device communicating with the power conversion device is proposed (for example, Patent Literature 1). The distributed power source is a power supply such as a photovoltaic cell, a storage battery, and a fuel cell.

An effective way to popularize the above management system is to standardize a communication system between the distributed power source and the management device, and standardization of the communication system is being attempted.

Also, the power conversion device is configured to control the distributed power source based on an output suppression schedule specified by a provider (a power provider, a power transmission/distribution provider, a power retailer, or the like).

CITATION LIST

Patent Literature

Patent Literature 1: JP 2014-171359 A

SUMMARY OF INVENTION

A management system includes a power conversion device converting power output from a distributed power source and a management device. The management device includes a transmitter configured to transmit to the power conversion device a command requesting a state of the power conversion device. The power conversion device includes a transmitter configured to transmit to the management device a response command including a property indicating a state of the power conversion device in response to the command. The property includes output suppression information on output suppression of the distributed power source based on output suppression specified by a provider.

A management method includes a step A of transmitting from a management device to a power conversion device a command requesting a state of the power conversion device, and a step B of transmitting from the power conversion device to the management device a response command including a property indicating a state of the power conversion device in response to the command. The power conversion device converts power output from a distributed power source. The property includes output suppression information on output suppression of the distributed power source based on output suppression specified by a provider.

A power conversion device is managed by a management device and converts power output from a distributed power source. The power conversion device includes a transmitter configured to transmit to the management device a response command including a property indicating a state of the power conversion device in response to a command received from the management device. The property includes output suppression information on output suppression of the distributed power source based on output suppression specified by a provider.

A management device manages a power conversion device convening power output from a distributed power source. The management device includes a transmitter configured to transmit to the power conversion device a command requesting a state of the power conversion device, and a reception unit receiving from the power conversion device a response command including a property indicating a state of the power conversion device in response to the command. The property includes output suppression information on output suppression of the distributed power source based on output suppression specified by a provider.

DESCRIPTION OF EMBODIMENTS

Hereinbelow, embodiments will be described with reference to the drawings. In the following description of the drawings, similar or identical components are shown with similar or identical reference signs.

It is to be noted that the drawings are schematic, and that the ratio of the respective dimensions may differ from the actual one. Accordingly, specific dimensions shall be determined in consideration of the following description. Among the drawings, the relationship among and the ratio of the dimensions partially differ.

Embodiments (Management System)

Figure 1:
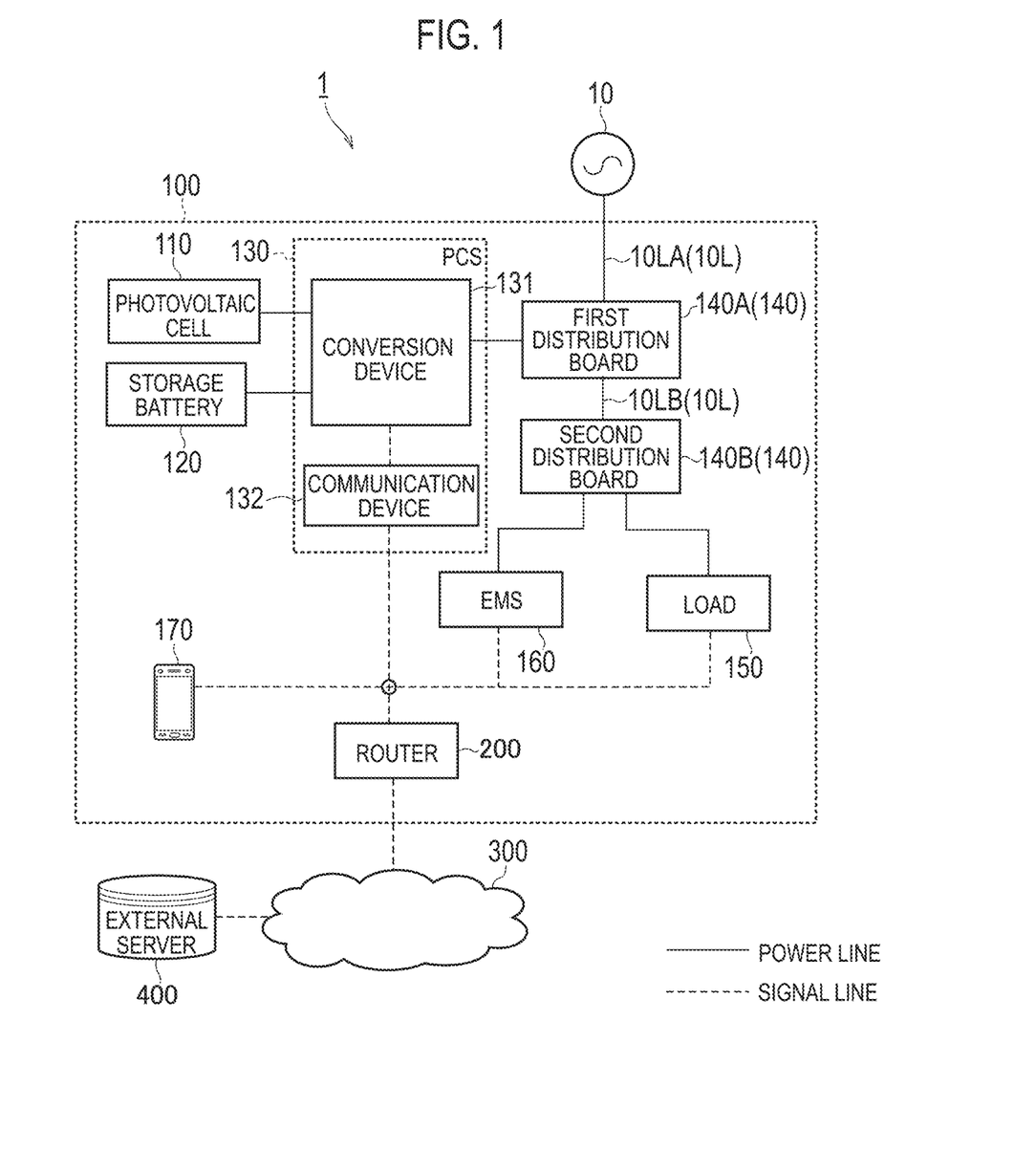
FIG. 1 illustrates a management system 1 according to an embodiment.

Hereinbelow, a management system according to an embodiment will be described. As illustrated in FIG. 1, a management system 1 includes a consumer's facility 100 (hereinbelow referred to as a facility 100) and an external server 400. The facility 100 includes a router 200. The router 200 is connected to the external server 400 via a network 300. The router 200 constitutes a local area network and is connected to respective devices (for example, a communication device 132 of a PCS 130, a load 150, an EMS 160, and a display device 170). In FIG. 1, the solid lines represent power lines, and the dotted lines represent signal lines. It is to be noted that the present invention is not limited to this, and that signals may be transmitted through power lines.

The facility 100 includes a photovoltaic cell 110, a storage battery 120, the PCS 130, a distribution board 140, the load 150, the EMS 160, and the display device 170.

The photovoltaic cell 110 is a device configured to generate power in accordance with light reception. The photovoltaic cell 110 outputs generated DC power. The power generation amount of the photovoltaic cell 110 changes depending on the solar irradiation amount provided to the photovoltaic cell 110. In the embodiment, the photovoltaic cell 110 is an example of a distributed power source that can be subject to output suppression based on output suppression specified by a provider.

The storage battery 120 is a device configured to store power. The storage battery 120 outputs stored DC power. In the embodiment, the storage battery 120 is an example of a distributed power source that cannot be subject to output suppression based on output suppression specified by the provider. However, the present invention is not limited to this, and the storage battery 120 may be a distributed power source that can be subject to output suppression based on output suppression specified by the provider.

The PCS 130 is an example of a power conversion device (PCS; Power Conditioning System) configured to convert power output from the distributed power source. In the embodiment, the PCS 130 includes a conversion device 131 and the communication device 132.

The conversion device 131 converts DC power from the photovoltaic cell 110 into AC power and converts DC power from the storage battery 120 into AC power. The conversion device 131 also converts AC power from a power grid 10 into DC power. The conversion device 131 is connected to a master power line 10L (a master power line 10LA and a master power line 10LB in the embodiment) connected to the power grid via 10 a first distribution board 140A and is connected to both the photovoltaic cell 110 and the storage battery 120. The master power line 10LA is a power line connecting the power grid 10 to the first distribution board 140A, and the master power line 10LB is a power line connecting the first distribution board 140A to a second distribution board 1409. Meanwhile, although the conversion device 131 is described as a hybrid power conversion device connected to the photovoltaic cell 110 and the storage battery 120 in the present embodiment, power conversion devices may be connected to the photovoltaic cell 110 and the storage battery 120, respectively.

The communication device 132 is connected to the conversion device 131 and receives various commands to be transmitted to the conversion device 131 and transmits various commands originating from the conversion device 131. In the communication between the communication device 132 and the conversion device 131, a protocol applied to the PCS 130 (for example, a unique protocol) is used.

In the embodiment, the communication device 132 is connected to the router 200 by in a wired or wireless manner. The communication device 132 is connected to the external server 400 via the router 200 and receives from the external server 400 an output suppression message for an instruction on output suppression of the distributed power source. The communication device 132 is also connected to the EMS 160 via the router 200 and transmits and receives predetermined commands having a predetermined format to and from the EMS 160. The predetermined format is not particularly limited and can be ECHONET Lite, SEP 2.0, KNX, or the like.

For example, the predetermined format is a format compliant with ECHONET Lite. In this case, the predetermined command is a SET command, a SET response command to a GET command, a GET commend, a GET response command to a GET command, or an INF command, for example. The SET command is a command including a property giving an instruction on setting or an operation to the PCS 130. The SET response command is a command indicating that the SET command has been received. The GET command is a command including a property indicating a state of the PCS 130 and used to obtain the state of the PCS 130. The GET response command is a command including a property indicating a state of the PCS 130 and including information requested by means of the GET command. The INF command is a command including a property indicating a state of the PCS 130 and used to inform the state of the PCS 130.

The distribution board 140 is connected to the master power line 10L. The distribution board 140 includes the first distribution board 140A and the second distribution board 1409. The first distribution board 140A is connected to the power grid 10 via the master power line 10LA and is connected to the photovoltaic cell 110 and the storage battery 120 via the conversion device 131. Also, the first distribution board 140A controls power output from the conversion device 131 and power supplied from the power grid 10 and supplies the power to the master power line 10LB. The power supplied through the master power line 10LB is distributed to respective apparatuses (the load 150 and the EMS 160 in this system) by the second distribution board 140B, The load 150 is a device consuming power supplied via the power line. Examples of the load 150 include devices such as a refrigerator, an illumination lamp, an air conditioner, and a television. The load 150 may include a single device or plural devices.

The EMS 160 is a device managing power information indicating power in the facility 100 (EMS; Energy Management System). The power in the facility 100 represents power which flows in the facility 100, power which the facility 100 purchases, power which the facility 100 sells, or the like. Thus, the EMS 160 manages at least the PCS 130, for example.

The EMS 160 may control the power generation amount of the photovoltaic cell 110, the charge amount of the storage battery 120, and the discharge amount of the storage battery 120. The EMS 160 may be integrated with the distribution board 140. The EMS 160 is a device connected to the network 300 and may be provided with functions of the EMS 160 by means of a cloud service via the network 300.

In the embodiment, the EMS 160 is connected to respective apparatuses (for example, the communication device 132 of the PCS 130 and the load 150) via the router 200 and transmits and receives predetermined commands having a predetermined format to and from the respective apparatuses.

The EMS 160 is connected to the display device 170 via the router 200 and communicates with the display device 170. The EMS 160 may transmit and receive predetermined commands having a predetermined format to and from the display device 170. As described above, the predetermined format is a format compliant with ECHONET Lite, for example.

The display device 170 displays power information indicating power in the facility 100. Examples of the display device 170 are a smartphone, a tablet, a digital television, and a dedicated terminal. The display device 170 is connected to the EMS 160 in a wired or wireless manner, and communicates with the EMS 160. The display device 170 may transmit and receive predetermined commands having a predetermined format to and from the EMS 160. The display device 170 receives from the EMS 160 data required for display of power information.

The network 300 is a communication network connecting the EMS 160 to the external server 400. The network 300 may be the Internet. The network 300 may include a mobile communication network. Also, the network 300 may be a dedicated communication line or a general communication line. For example, in a case where the output of the photovoltaic cell 110 is a predetermined output or higher, output suppression can be carried out more reliably by using a dedicated communication line as the network 300.

The external server 400 is a server managed by a provider such as a power provider, a power transmission/distribution provider, and a power retailer. For example, the provider specifies output suppression of the distributed power source. Specifically, the external server 400 transmits an output suppression message for an instruction on output suppression of the distributed power source. The external server 400 may transmit a command for an instruction on suppression of the power flow amount from the power grid 10 to the facility 100 (DR Demand Response).

The output suppression message includes a target output suppression level indicating a level of output suppression of the distributed power source (the photovoltaic cell 110 in this system). The target output suppression level is determined in accordance with output accredited as an output ability (for example, rated output) of the PCS controlling the distributed power source (hereinbelow, an equipment accreditation output). The target output suppression level may be expressed as an absolute value (for example,  kW) derived in accordance with the equipment accreditation output, as a relative value (for example, decreased by  kW) to the equipment accreditation output, or as a suppression ratio (for example, **%) to the equipment accreditation output. Meanwhile, although the equipment accreditation output has been described, an equipment accreditation capacity [kWh] may be used instead.

In a case where the output ability of the distributed power source and the output ability of the PCS differ, the equipment accreditation output is whichever is lower. In a case where a plurality of PCSs are installed, the equipment accreditation output is the total output abilities of the plurality of PCSs.

In the embodiment, the output suppression message includes calendar information indicating a schedule of output suppression of the distributed power source. In the calendar information, the schedule of the output suppression of the distributed power source can be set in units of thirty minutes. The calendar information may include a schedule for one day, a schedule for one month, or a schedule for one year.

In the embodiment, a predetermined period may be determined as a maximum period in which the output suppression of the distributed power source is performed. The predetermined period may be the number of days in a year (number-of-days rule) or the cumulative time in a year (cumulative-time rule), for example. More specifically, the predetermined period may be thirty days in a year (30-day rule) or 360 hours in a year (360-hour rule), for example.

However, the predetermined period does not have to be determined (specification rule). These rules are types of output suppression of the distributed power source in accordance with the output suppression message.

(Application Scene)

Under the above circumstances, even in a case where the output suppression schedule is specified by the provider, the output suppression of the distributed power source represented by the photovoltaic cell 110 is not always performed in actuality. For example, the necessity for the Output suppression of the distributed power source depends on the amount of power consumption of the load 150 covered by output power of the distributed power source. In a case where the distributed power source is a power supply generating power with use of natural energy such as the photovoltaic cell 110, the necessity for the output suppression of the distributed power source depends on the amount of the natural energy.

However, the output suppression message is transmitted to the PCS 130, not to the EMS 160. Thus, the EMS 160 cannot obtain the output suppression message. Even in a case where the EMS 160 can obtain the output suppression message, the EMS 160 cannot know whether or not the output suppression of the distributed power source is to be actually performed based on the output suppression message.

To deal with such a problem, in the embodiment, the following management is performed. Specifically, the EMS 160 transmits a command requesting a state of the PCS 130 (for example, a GET command) to the PCS 130, and the PCS 130 transmits a response command including a property indicating a state of the PCS 130 to the EMS 160 in response to the command. The property includes output suppression information on output suppression of the distributed power source based on output suppression specified by the provider. Here, the output suppression information may be information to be used to determine whether or not the output suppression of the distributed power source is to be actually performed based on the output suppression specified by the provider.

For example, the output suppression information may include information indicating whether or not the PCS 130 is targeted for the output suppression of the distributed power source. For example, the output suppression information can be in the form of a value "targeted" or "not targeted." In this case, the output suppression information may be information indicating whether or not a contract to perform output suppression targeted for the PCS 130 (or the distributed power source) is entered into with the provider. The output suppression information may be information indicating whether or not the PCS 130 is allowed to do reverse power flow from the distributed power source to the power grid 10.

The output suppression information may be information indicating whether or not the rated Output of the PCS 130 (or the distributed power source) is a predetermined threshold value or higher. Also, the output suppression information may be information indicating the rated output (at the time of output suppression) of the PCS at the time of output suppression. It is to be noted that the rated output is rated current, rated voltage, rated power, or the like. Further, the output suppression information may include information on the provider which has notified the output suppression. The information on the provider includes a provider name, a provider code, a provider classification, or the like.

The output suppression information may include whether the PCS 130 is in a state of self-sustained operation or in a state of grid-connected operation. In a case where the PCS 130 is in the state of the self-sustained operation, the reverse power flow is unlikely to occur, and the output suppression is difficult to perform.

The output suppression information may include information indicating whether or not there is a function of informing that the PCS 130 is performing the output suppression. Here, "the PCS 130 is performing the output suppression" means that the PCS 130 is actually performing the output suppression.

The output suppression information may include information indicating that the output suppression from the distributed power source to the power grid 10 is being performed at the time of reception of the command. In this case, the output suppression information can be in the form of a value "actual control in progress," for example. The output suppression information may include information indicating that timing corresponding to the command is a time period in which the output suppression from the distributed power source to the power grid 10 is performed. For example, the output suppression information can be in the form of a value "time period." Here, the timing corresponding to the command may be command reception timing or timing specified by information included in the command. The timing corresponding to the command may be timing after a lapse of a predetermined period after the command reception timing. Meanwhile, the output suppression information may include at least one out of time to start the output suppression, a time period in which the output suppression is continued, and time to end the output suppression.

The output suppression information may include information indicating that the output suppression from the distributed power source to the power grid 10 is not being performed at the time of reception of the command. For example, the output suppression information can be in the form of a value "actual control not in progress." The output suppression information may include information indicating that timing corresponding to the command is not a time period in which the output suppression from the distributed power source to the power grid 10 is performed. For example, the output suppression information can be in the form of a value "not time period." Here, the timing corresponding to the command may be command reception timing or timing specified by information included in the command. The timing corresponding to the command may be timing after a lapse of a predetermined period after the command reception timing.

(Communication Device)

Figure 2:
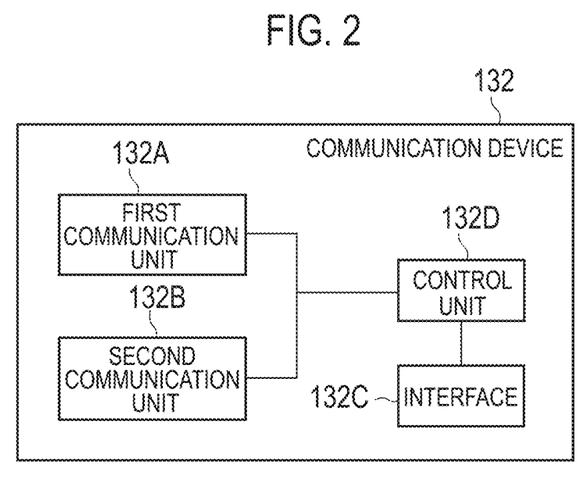
FIG. 2 illustrates a communication device 132 according to the embodiment.

Hereinbelow, the communication device according to the embodiment will be described. As illustrated in FIG. 2, the communication device 132 includes a first communication unit 132A, a second communication unit 132B, an interface 132C, and a control unit 132D, The first communication unit 132A receives from the external server 400 an output suppression message giving an instruction on output suppression of the distributed power source. In the embodiment, the first communication unit 132A receives the output suppression message from the external server 400 not via the EMS 160.

The second communication unit 132B transmits and receives predetermined commands having a predetermined format to and from the EMS 160. As described above, the predetermined format is a format compliant with ECHONET Lite, for example. Here, the predetermined format used for communication between the communication device 132 (second communication unit 132B) and the EMS 160 may differ from one used for communication between the communication device 132 (first communication unit 132A) and the external server 400. Also, the predetermined format used for communication between the second communication unit 132B (second communication unit 132B) and the EMS 160 may differ from one used for communication between the communication device 132 (interface 132C) and the conversion device 131.

The interface 132C is an interface with the conversion device 131. The interface 132C may be a cable or radio interface. In the communication between the communication device 132 and the conversion device 131, a protocol applied to the PCS 130 (for example, a unique protocol) is used.

The control unit 132D is constituted by a memory and a CPU to control the communication device 132. For example, the control unit 132D controls the conversion device 131 with use of the interface 132C to control output of the distributed power source based on the output suppression message. The control unit 132D obtains a state of the conversion device 131 (for example, the power generation amount of the photovoltaic cell 110, the charge amount of the storage battery 120, and the discharge amount of the storage battery 120) from the conversion device 131 with use of the interface 132C. The control unit 132D generates a command configured to control the conversion device 131 based on a command received from the EMS 160 and outputs the command to the conversion device 131 with use of the interface 132C.

(Management Device)

Figure 3:
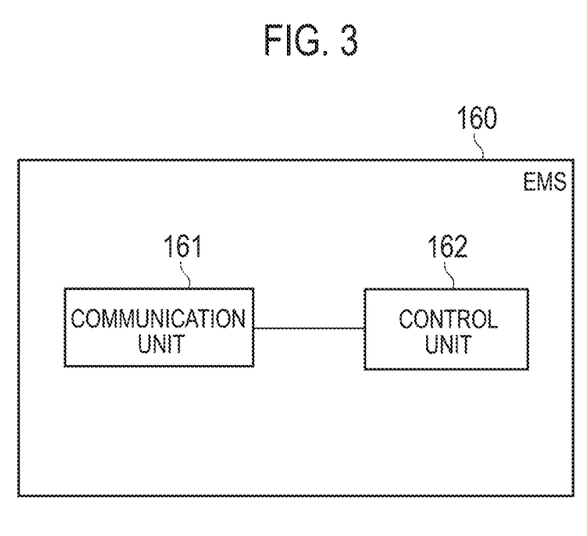
FIG. 3 illustrates an EMS 160 according to the embodiment.

Hereinbelow, the management device according to the embodiment will be described. As illustrated in FIG. 3, the EMS 160 includes a communication unit 161 and a control unit 162.

The communication unit 161 transmits and receives predetermined commands having a predetermined format to and from the communication device 132. As described above, the predetermined format is a format compliant with ECHONET Lite, for example.

The control unit 162 is constituted by a memory and a CPU to control the EMS 160. The control unit 162 may control the power generation amount of the photovoltaic cell 110, the charge amount of the storage battery 120, and the discharge amount of the storage battery 120.

(Message Format)

Hereinbelow, the message format according to the embodiment will be described. Here, a case where the predetermined format is a format compliant with ECHONET Lite will be illustrated.

Figure 4:
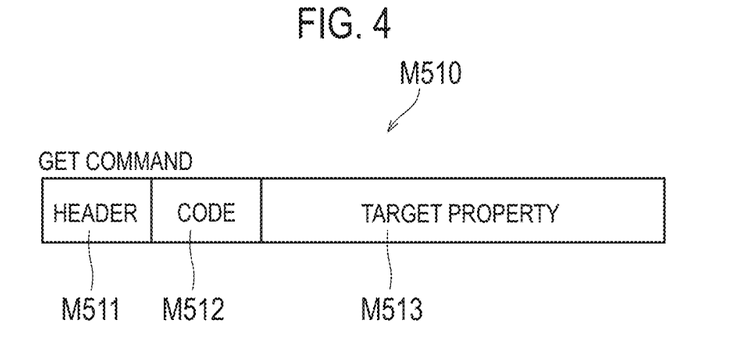
FIG. 4 illustrates an example of a command according to the embodiment.

As illustrated in FIG. 4, a GET command M510 includes a header M511, a code M512, and a target property M513. In the embodiment, the GET command M510 is an example of a command to be transmitted from the EMS 160 to the communication device 132.

The header M511 is information indicating an address to which the GET command M510 is to be transmitted. The code M512 is information indicating a type of the command including the code M512. Here, the code M512 is information indicating that the command including the code M512 is a GET command. The target property M513 includes a property which the EMS 160 wishes to know. An example of such a property is output suppression information.

Figure 5:
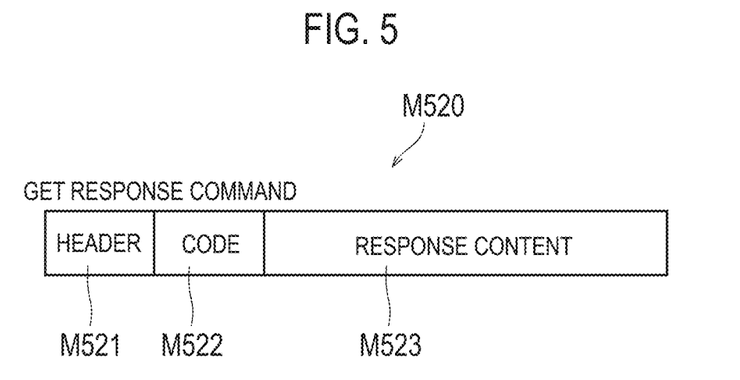
FIG. 5 illustrates an example of a response command according to the embodiment.

As illustrated in FIG. 5, a GET response command M520 includes a header M521, a code M522, and a response content M523. In the embodiment, the GET response command M520 is an example of a command to be transmitted from the communication device 132 to the EMS 160 based on the command received from the EMS 160.

The header 4521 is information indicating an address to which the GET response command M520 is to be transmitted. The code M522 is information indicating a type of the command including the code M522. Here, the code M522 is information indicating that the command including the code M522 is a GET response command. The response content M523 includes a property requested by the GET command. An example of such a property is output suppression information.

(Management Method)

Hereinbelow, a management method according to the embodiment will be described. Here, a case where a predetermined format used in communication between the PCS 130 (communication device 132) and the EMS 160 is a format compliant with ECHONET Lite will be illustrated.

Figure 6:
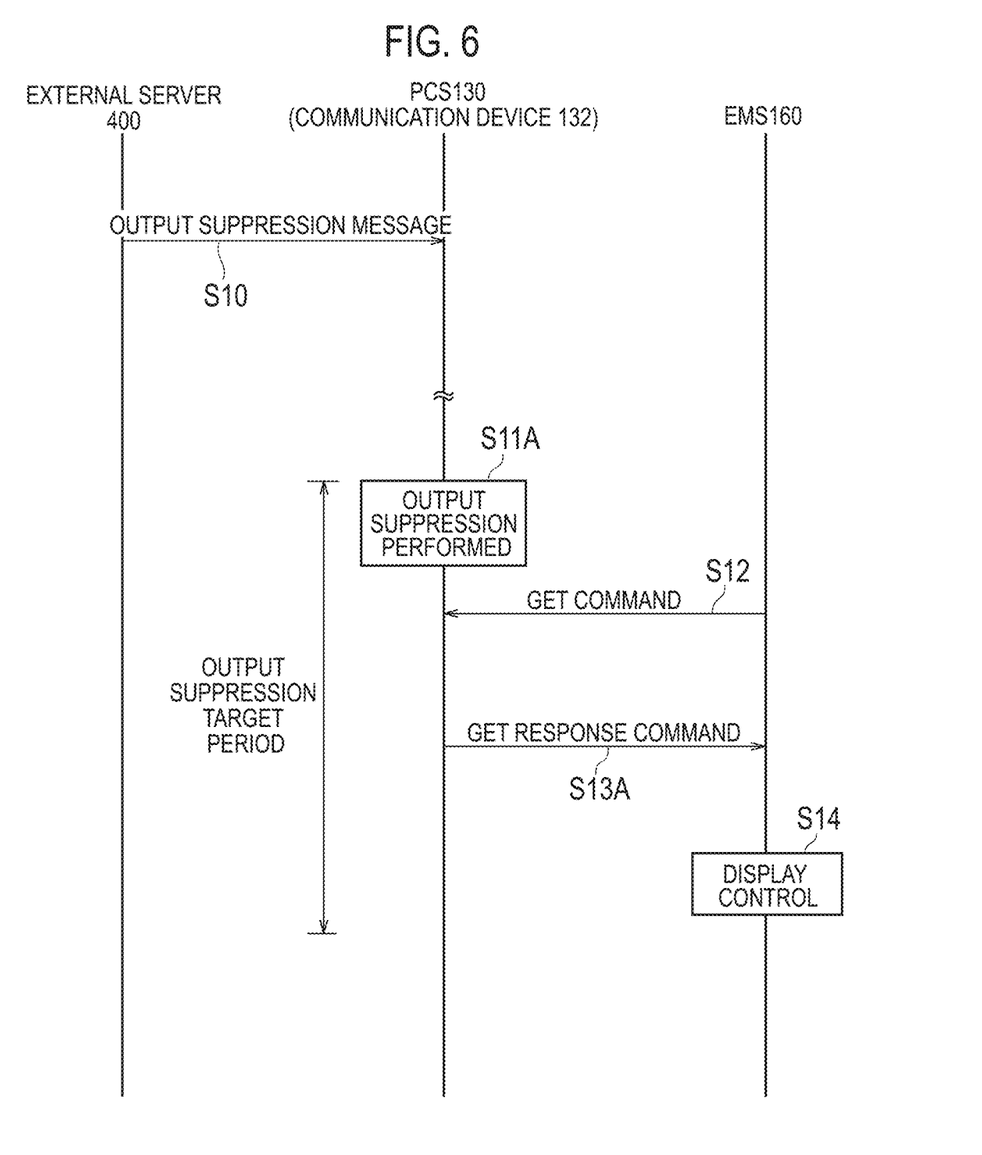
FIG. 6 is a sequence diagram illustrating a management method according to the embodiment.

First, a case where output suppression specified by the provider is executed will be described with reference to FIG. 6.

In step S10, the PCS 130 receives an output suppression message from the external server 400 not via the EMS 160.

In step S11A, the PCS 130 performs output suppression of the distributed power source based on the output suppression message. That is, the output suppression of the distributed power source based on the output suppression specified by the provider is performed.

In step S12, the EMS 160 transmits a GET command to the PCS 130. The EMS 160 may transmit the GET command in accordance with a request (for example, a user's operation) received from the display device 170. The EMS 160 may periodically transmit the GET command to the PCS 130. The GET command includes output suppression information as a property.

In step S13A, the PCS 130 transmits a GET response command to the EMS 160 based on the GET command. The GET response command includes output suppression information as a property. Here, the output suppression information at least includes information for determining that the output suppression of the distributed power source is being performed.

In step S14, the EMS 160 performs display control of information on the output suppression of the distributed power source based on the GET response command. Such display control is control of displaying on the display device 170 whether or not the output suppression of the distributed power source is being performed.

Figure 7:
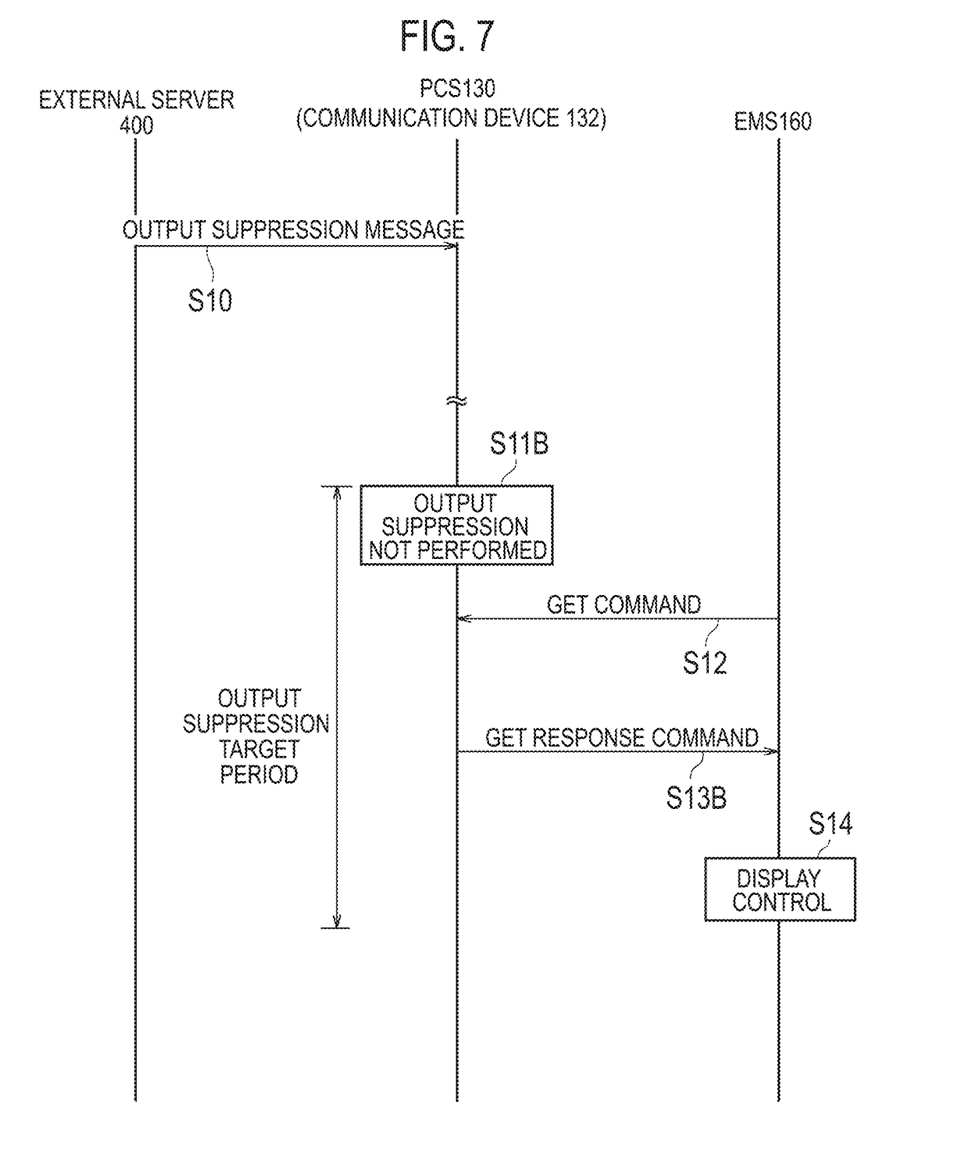
FIG. 7 is a sequence diagram illustrating a management method according to the embodiment.

Second, a case where output suppression specified by the provider is not executed will be described with reference to FIG. 7. Processing illustrated in FIG. 7 is similar to that illustrated in FIG. 6 except step S11A and step S13A. Hence, different points from those in FIG. 6 will mainly be described below In step S11B, the PCS 130 does not perform output suppression of the distributed power source based on the output suppression message. That is, the output suppression of the distributed power source is not performed in actuality even in a case where the output suppression is specified by the provider. For example, it seems that reverse power flow from the distributed power source to the power grid 10 is not performed because the amount of the output power of the distributed power source represented by the photovoltaic cell 110 is small, or because the amount of the power consumption of the load 150 is large.

In step S13B, the PCS 130 transmits a GET response command to the EMS 160 based on the GET command. The GET response command includes output suppression information as a property. Here, the output suppression information at least includes information for determining that the output suppression of the distributed power source is not being performed.

(Effects)

In the embodiment, the PCS 130 transmits to the EMS 160 a response command including a property indicating a state of the PCS 130 in response to a command. The property includes output suppression information on output suppression of the distributed power source based on output suppression specified by the provider. Accordingly, regardless of whether or not the EMS 160 can obtain an output suppression message, the EMS 160 can know whether or not the output suppression of the distributed power source is actually being performed. Conversely, in a case where the EMS 160 cannot know the output suppression information as in a conventional case, it is unknown whether the reason why the output of the PCS 130 decreases is that the power generation amount of the photovoltaic cell 110 is lowered or that the output is lowered due to the output suppression, which is problematic.

First Modification Example

Figure 8:
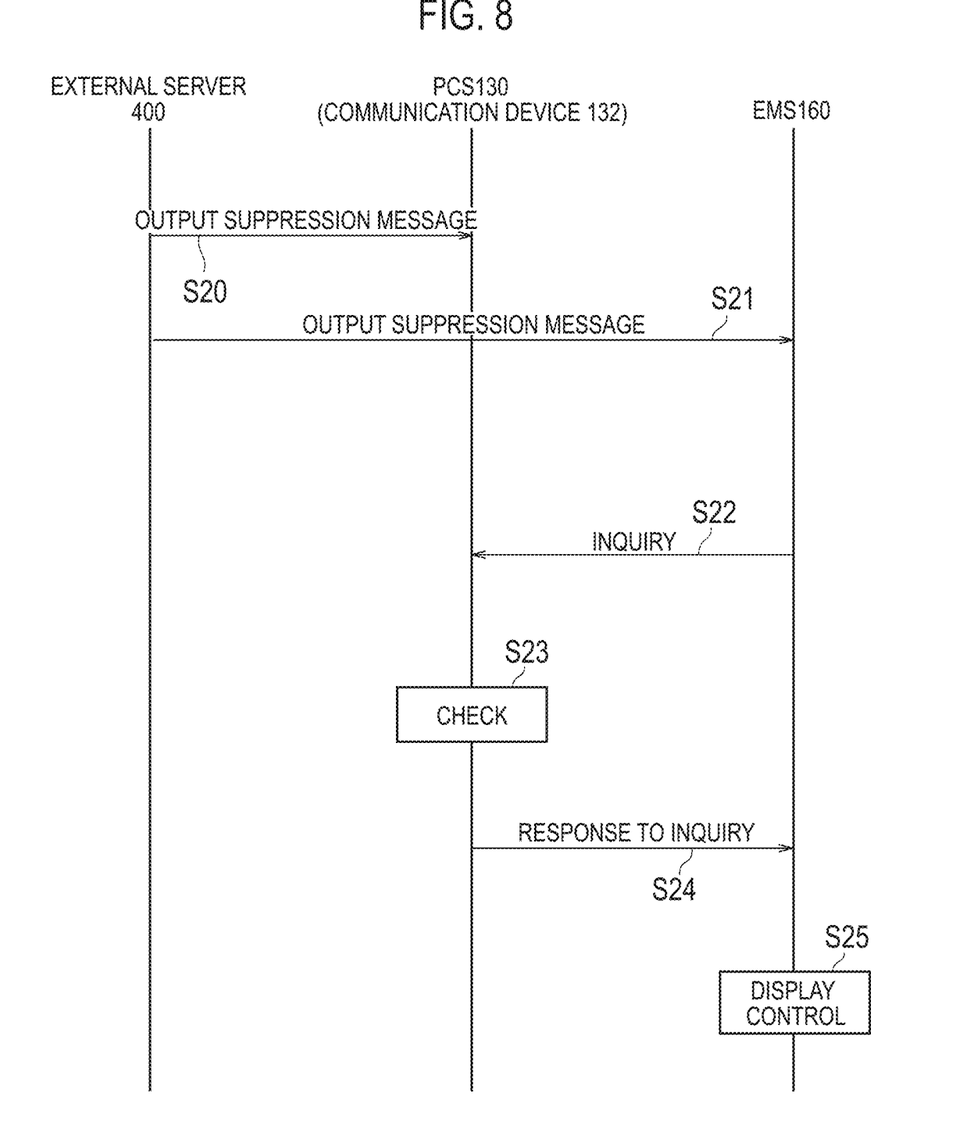
FIG. 8 is a sequence diagram illustrating a management method according to a first modification example.

Hereinbelow, a first modification example of the embodiment will be described. Different points from those in the embodiment will mainly be described below In the first modification example, both the PCS 130 and the EMS 160 individually obtain calendar information indicating a schedule of output suppression specified by the provider Since the calendar information is included in an output suppression message, at least the PCS 130 receives the calendar information from the external server 400. The EMS 160 may receive the calendar information from the external server 400 or by another means.

In such a case, the PCS 130 checks whether or not the calendar information obtained by the EMS 160 is equal to the calendar information obtained by the PCS 130. The PCS 130 may check the equality of the calendar information based on at least one out of a variable, a number string, a character string, and a check sum derived from a file name of the calendar information, identification information of the schedule, and the calendar information.

For example, as illustrated in FIG. 8, in step S20, the PCS 130 receives an output suppression message from the external server 400. Here, the PCS 130 may receive the output suppression message either via or not via the EMS 160.

In step S21, the EMS 160 receives an output suppression message from the external server 400. In a case where the PCS 130 receives the output suppression message via the EMS 160, step S21 may be part of step S20. The EMS 160 may obtain calendar information by another means.

In step S22, the EMS 160 transmits to the PCS 130 an inquiry inquiring on equality of the calendar information. For example, the EMS 160 transmits at least one out of a variable, a number string, a character string, and a check sum derived from a file name of the calendar information, identification information of the schedule, and the calendar information.

In step S23, the PCS 130 checks whether or not the calendar information obtained by the EMS 160 is equal to the calendar information obtained by the PCS 130.

In step S24, the PCS 130 transmits to the EMS 160 an inquiry response including a result of check of the equality of the calendar information, In step S25, the EMS 160 performs display control of information on the output suppression of the distributed power source based on the inquiry response. Such display control may be control of displaying on the display device 170 information indicating whether or not the equality of the calendar information has been confirmed or control of displaying the calendar information on the display device 170.

(Effects)

According to the first modification example, the PCS 130, which obtains calendar information through a proper channel, checks whether or not calendar information obtained by the EMS 160 is equal to the calendar information obtained by the PCS 130. Accordingly, even in a case where both the PCS 130 and the EMS 160 individually obtain calendar information, it is possible to confirm whether or not the calendar information obtained by the EMS 160 is proper calendar information, Other Embodiments Although the present invention has been described by the above embodiment, the description and the drawings constituting part of this disclosure should not be construed as limiting the present invention. Various substitute embodiments, examples, and operation technologies will clearly be obvious to those skilled in the art from this disclosure.

In the embodiment, the output suppression information is included in the GET response command. However, the embodiment is not limited to this. The output suppression information may be included in an INF command to be transmitted from the PCS 130 to the EMS 160. Also, under predetermined conditions, the PCS 130 may spontaneously transmit the output suppression information to the EMS 160. In a case of the predetermined conditions, such as a case where a value of a property regarding the output suppression information changes, the output suppression information may be broadcasted. To reduce congestion, the output suppression information may be broadcasted in a domain, or the output suppression information may be transmitted with time difference per predetermined node, for example.

In the embodiment, a case where the EMS 160 obtains calendar information from the external server 400 has been illustrated. However, the embodiment is not limited to this. The EMS 160 may obtain from the PCS 130 calendar information which the PCS 130 has received from the external server 400.

In the embodiment, the photovoltaic cell 110 has been illustrated as a distributed power source subject to output suppression specified by the provider. However, such a distributed power source is not limited to this. The distributed power source may be a device generating power with use of natural energy such as wind power and geothermal power. Alternatively, the distributed power source may be a fuel cell generating power with use of fuel gas.

In the embodiment, a case where the predetermined format to be used in communication between the communication device 132 and the EMS 160 is a format compliant with ECHONET Lite has been described. However, the embodiment is not limited to this. The predetermined format may be any format standardized as a format to be used in the facility 100.

In the embodiment, the PCS 130 (multi PCS) controlling output of the photovoltaic cell 110 and the storage battery 120 has been illustrated. However, the embodiment is not limited to this. The PCS 130 may be a PCS controlling output of the photovoltaic cell 110.

In the embodiment, although a case where the first communication unit 132A and the second communication unit 132B are different components has been described, the first communication unit 132A and the second communication unit 132B may be configured to be integrated. That is, the first communication unit 132A may also function as the second communication unit 132B.

The entire content of Japanese patent application No. 2016-66753 (filed on Mar. 29, 2016) is incorporated herein by reference.

The invention claimed is:

1. A management system comprising:
a management device, comprising:
a transmitter configured to transmit to a power conversion device a command requesting a state of the power conversion device; and
the power conversion device configured to convert power output from a distributed power source, the power conversion device comprising:
a transmitter configured to transmit, to the management device, a response command including a property, the property indicating a state of the power conversion device in response to the command, and the property including output suppression information on output suppression from the distributed power source to a power grid based on output suppression specified by a provider,
wherein the output suppression information includes
information indicating that the output suppression from the distributed power source to the power grid is not being performed at a time of reception of the command, or
information indicating that timing corresponding to the command is not a time period in which the output suppression from the distributed power source to the power grid is performed.

2. The management system according to claim 1, wherein the output suppression information further includes information
indicating that the power conversion device is targeted for the output suppression from the distributed power source to the power grid, or
indicating that the power conversion device is not targeted of the output suppression.

3. The management system according to claim 1, wherein the output suppression information indicates that the power conversion device is in a state of self-sustained operation or in a state of grid-connected operation.

4. The management system according to claim 1, wherein the output suppression information further includes information
indicating that the power conversion device has a function of informing that the power conversion device is performing the output suppression, or
indicating that the power conversion device does not have the function.

5. The management system according to claim 1, wherein the output suppression information further includes
information indicating that the output suppression from the distributed power source to the power grid is being performed at a time of reception of the command, or
information indicating that timing corresponding to the command is a time period in which the output suppression from the distributed power source to the power grid is performed.

6. The management system according to claim 1, wherein the power conversion device and the management device are configured to individually obtain calendar information indicating a schedule of the output suppression specified by the provider, and the power conversion device is configured to confirm that the calendar information obtained by the management device is equal to the calendar information obtained by the power conversion device.

7. The management system according to claim 6, wherein the power conversion device is configured to check equality of the calendar information based on at least one out of a variable, a number string, a character string, and a check sum derived from a file name of the calendar information, identification information of the schedule, and the calendar information.

8. The management system according to claim 1, wherein the power conversion device is configured to receive an output suppression message from an external server, and the output suppression information indicates whether the power conversion device performs the output suppression from the distributed power source to the power grid based on the output suppression message.

9. The management system according to claim 1, wherein the power conversion device further includes a receiver configured to receive, from an external server without passing through the management device, an output suppression message for the output suppression from the distributed power source to the power grid.

10. A power conversion device managed by a management device, the power conversion device converting power output from a distributed power source, comprising:
   a transmitter transmitting, to the management device in response to a command received from the management device, a response command including a property indicating a state of the power conversion device,
   wherein the property includes output suppression information on output suppression from the distributed power source to a power grid based on output suppression specified by a provider,
   wherein the output suppression information includes
      information indicating that the output suppression from the distributed power source to the power grid is not being performed at a time of reception of the command, or
      information indicating that timing corresponding to the command is not a time period in which the output suppression from the distributed power source to the power grid is performed.

11. A management device managing a power conversion device that converts power output from a distributed power source, comprising:
   a transmitter transmitting, to the power conversion device, a command requesting a state of the power conversion device; and
   a reception unit receiving, from the power conversion device in response to the command, a response command including a property indicating a state of the power conversion device,
   wherein the property includes output suppression information on output suppression from the distributed power source to a power grid based on output suppression specified by a provider, and
   wherein the output suppression information includes
      information indicating that the output suppression from the distributed power source to the power grid is not being performed at a time of reception of the command, or
      information indicating that timing corresponding to the command is not a time period in which the output suppression from the distributed power source to the power grid is performed.

12. A power conversion device managed by a management device, the power conversion device converting power output from a distributed power source, comprising:
   a transmitter transmitting, to the management device in response to a command received from the management device, a response command including a property indicating a state of the power conversion device,
   wherein
   the property includes output suppression information on output suppression from the distributed power source to a power grid based on output suppression specified by a provider, and
   the power conversion device further includes a receiver configured to receive, from an external server without passing through the management device, an output suppression message for the output suppression from the distributed power source to the power grid.

* * * * *